United States Patent
Wang

(10) Patent No.: US 9,793,978 B2
(45) Date of Patent: Oct. 17, 2017

(54) EFFICIENT AERONAUTICAL INFORMATION DOWNLOAD COUPLED WITH ADS-B FUNCTION

(71) Applicant: Honeywell International Inc., Morris Plains, NJ (US)

(72) Inventor: Haiming Wang, Beijing (CN)

(73) Assignee: Honeywell International Inc., Morris Plains, NJ (US)

(*) Notice: Subject to any disclaimer, the term of this patent is extended or adjusted under 35 U.S.C. 154(b) by 69 days.

(21) Appl. No.: 15/004,399

(22) Filed: Jan. 22, 2016

(65) Prior Publication Data

US 2017/0214454 A1 Jul. 27, 2017

(51) Int. Cl.
*H04B 7/185* (2006.01)
*G01W 1/04* (2006.01)
*G01W 1/00* (2006.01)

(52) U.S. Cl.
CPC .......... *H04B 7/18506* (2013.01); *G01W 1/04* (2013.01); *G01W 2001/003* (2013.01); *G01W 2001/006* (2013.01)

(58) Field of Classification Search
CPC ............... H04B 7/18506; G01W 1/04; G01W 2001/003; G01W 2001/006
See application file for complete search history.

(56) References Cited

U.S. PATENT DOCUMENTS

| 7,961,136 | B2 | 6/2011 | Stefani et al. |
| 8,004,452 | B2 | 8/2011 | Rolfe et al. |
| 8,437,893 | B2 | 5/2013 | Mead et al. |
| 9,221,553 | B1* | 12/2015 | Mitchell ................ B64D 45/00 |
| 2003/0093187 | A1* | 5/2003 | Walker .................... B64C 13/20 701/1 |
| 2007/0052802 | A1* | 3/2007 | Kasutani ................ H04H 60/59 348/143 |
| 2008/0036659 | A1 | 2/2008 | Smith et al. |

(Continued)

OTHER PUBLICATIONS

European Patent Office, "Extended European Search Report from EP Application No. 17150739.5, dated Jun. 27, 2017", from Foreign Counterpart of U.S. Appl. No. 15/004,399, filed Jun. 27, 2017, pp. 1-9.

(Continued)

*Primary Examiner* — Brian D Nguyen
(74) *Attorney, Agent, or Firm* — Fogg & Powers LLC

(57) ABSTRACT

A method and system for downloading aeronautical data using an automatic dependent surveillance-broadcast (ADS-B) is provided. The method comprises creating a first data sequence structure that includes a receive time for each of one or more received ADS-B messages; creating a second data sequence structure that includes a packet time for each of one or more received aeronautical data packets that are without position information; mapping the received aeronautical data packets respectively to the ADS-B messages by comparing the receive time for each of the received ADS-B messages with the packet time for each of the received aeronautical data packets to produce a correlation between the ADS-B messages and the aeronautical data packets; and deriving position information for each of the received aeronautical data packets from each correlation between an ADS-B message and an aeronautical data packet.

20 Claims, 5 Drawing Sheets

(56) References Cited

U.S. PATENT DOCUMENTS

2012/0133552 A1\* 5/2012 Wu .................. G01S 19/10
   342/357.23
2014/0197982 A1  7/2014 Wang et al.
2015/0325129 A1  11/2015 Simonin et al.
2016/0269274 A1\* 9/2016 Anandappan ......... H04B 7/185
2016/0349361 A1\* 12/2016 Schulte ................. G01S 13/74

OTHER PUBLICATIONS

Mohleji, "Flight Management Systems Information Exchange With AERA to Support Future Air Traffice Control Concepts", Mar. 23, 1992, pp. 240-247, Publisher: Institute of Electrical and Electronics Engineers.

\* cited by examiner

EFFICIENT AERONAUTICAL INFORMATION DOWNLOAD COUPLED WITH ADS-B FUNCTION

BACKGROUND

When an aircraft is in flight, an important factor that impacts the flight is hazardous weather, such as icing, turbulence, storms, lightning, and the like. If there is not correct detection of all kinds of bad weather, the aircraft can be subjected to severe damage with possibly disastrous results.

At present, weather radar equipped on many aircraft is used to detect weather conditions along a flight path. Current weather radar systems are provided for use in single aircraft, with the sensed weather data not known by other aircraft.

In recent years, the connected radar concept has been proposed as the evolution of current weather radar systems. In a connected radar system, the weather information is downloaded from or uploaded to the aircraft. This weather information may then be widely re-used by other aircraft during flight. In proposed connected radar systems, a data transmission algorithm is used to request weather information from aircraft, and then the aircraft transmits the weather data to a ground station. In the defined algorithm, aircraft position is always associated to each weather data packet. This means the aircraft position element is sent every time a weather data packet is transmitted, increasing the burden on an already limited frequency bandwidth.

SUMMARY

A method and system for downloading aeronautical data using an automatic dependent surveillance-broadcast (ADS-B) is provided. The method comprises creating a first data sequence structure that includes a receive time for each of one or more received ADS-B messages; creating a second data sequence structure that includes a packet time for each of one or more received aeronautical data packets that are without position information; mapping the one or more received aeronautical data packets respectively to the one or more ADS-B messages by comparing the receive time for each of one or more received ADS-B messages with the packet time for each of one or more received aeronautical data packets to produce a correlation between the one or more ADS-B messages and the one or more aeronautical data packets; and deriving position information for each of the one or more received aeronautical data packets from each correlation between an ADS-B message and an aeronautical data packet.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method and system for efficiently downloading aeronautical information using automatic dependent surveillance-broadcast is described herein. In the present approach, aircraft position information is omitted in each transmitted aeronautical data packet, thereby increasing transmission efficiency and decreasing the burden on the relevant communication bandwidth. A method for enabling and disabling of aircraft position information in downloading aeronautical data from an aircraft is also provided.

Automatic dependent surveillance-broadcast (ADS-B) is a cooperative surveillance technology in which an aircraft determines its position via satellite navigation and periodically broadcasts its position, enabling the aircraft to be tracked. An ADS-B message contains the full aircraft position information and is transmitted continuously from the aircraft. The position information can be stored continuously or just saved as sampling together with the receiving time of the ADS-B message in a ground center.

Many aircraft are capable of providing real time aeronautical data, such as from various onboard sensors. For example, weather data can be provided by a weather radar onboard the aircraft. The weather data is sent to an onboard communications manager, which transmits weather data packets to the ground center through an appropriate communication channel. The weather data can include information about lightning, hail, wind shear, turbulence, compacted volumetric buffer, and the like.

In general, the present method links the received weather data packets, without aircraft position information, with received ADS-B messages so that aircraft position information can be derived implicitly for the weather data packets. The aircraft position information is derived from the ADS-B messages by comparing the packet time of the received data packet and the receive time of the ADS-B messages.

Further details of the present method and system are described hereafter with reference to the drawings.

Figure 1:
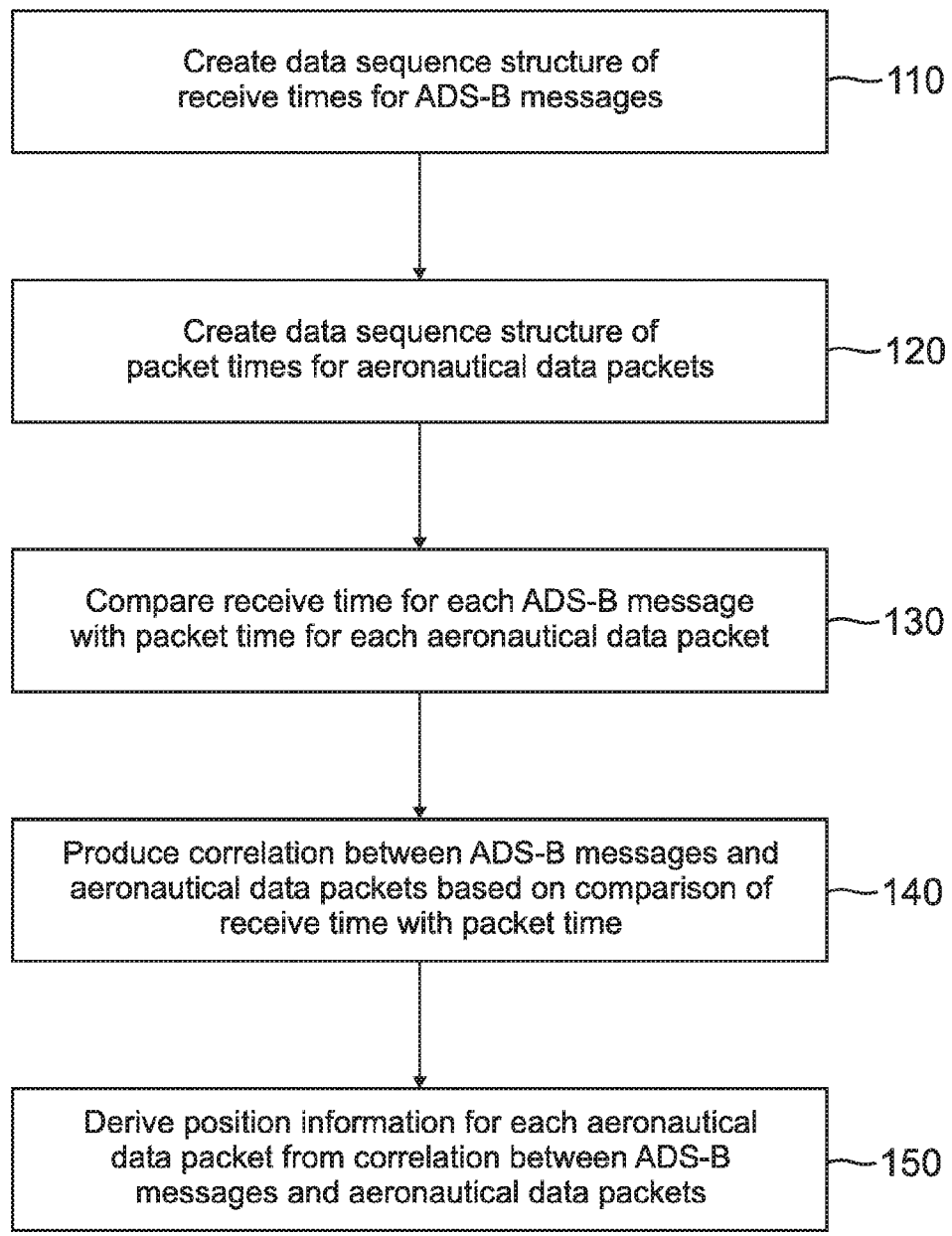
FIG. 1 is a flow diagram of an exemplary method for downloading aeronautical data using an automatic dependent surveillance-broadcast (ADS-B)

FIG. 1 is a flow diagram of an exemplary method 100 for efficient downloading of aeronautical data using ADS-B. In method 100, a first data sequence structure is created that includes a receive time for each of one or more received ADS-B messages (block 110). In addition, a second data sequence structure is created that includes a packet time for each of one or more received aeronautical data packets (block 120). The received aeronautical data packets are then mapped respectively to the ADS-B messages by comparing the receive time for each of the ADS-B messages with the packet time for each of the aeronautical data packets (block 130). This comparison of receive time with packet time is used by method 100 to produces a correlation between the ADS-B messages and the aeronautical data packets (block 140). The position information is then derived for each of the aeronautical data packets from each correlation between an ADS-B message and an aeronautical data packet (block 150).

Figure 2:
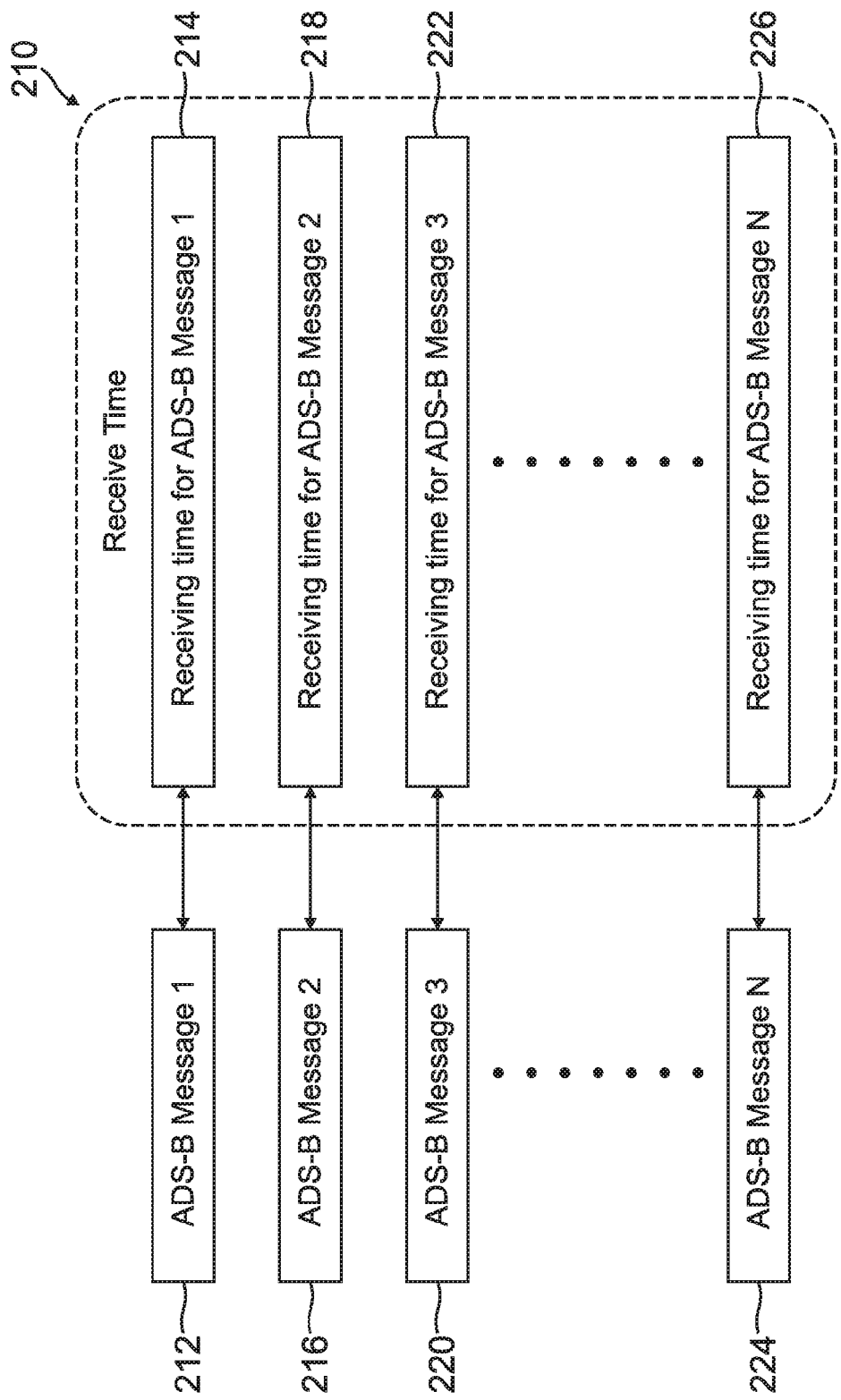
FIG. 2 is a schematic diagram illustrating the creation of a data sequence structure according to one embodiment, which includes receiving time information for received ADS-B messages.
Figure 3:
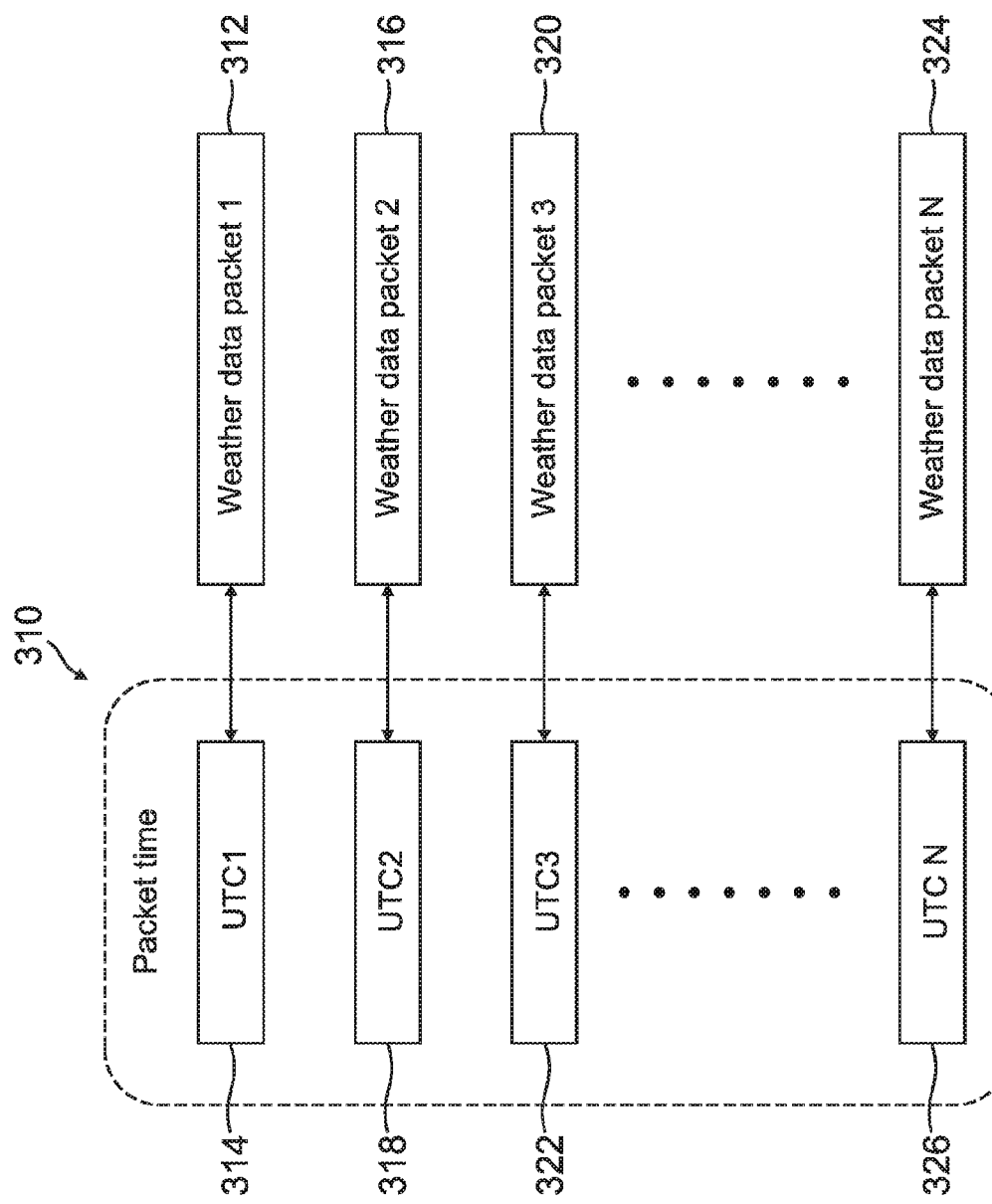
FIG. 3 is a schematic diagram illustrating the creation of a data sequence structure according to one embodiment, which includes packet time information for received data packets.
Figure 4:
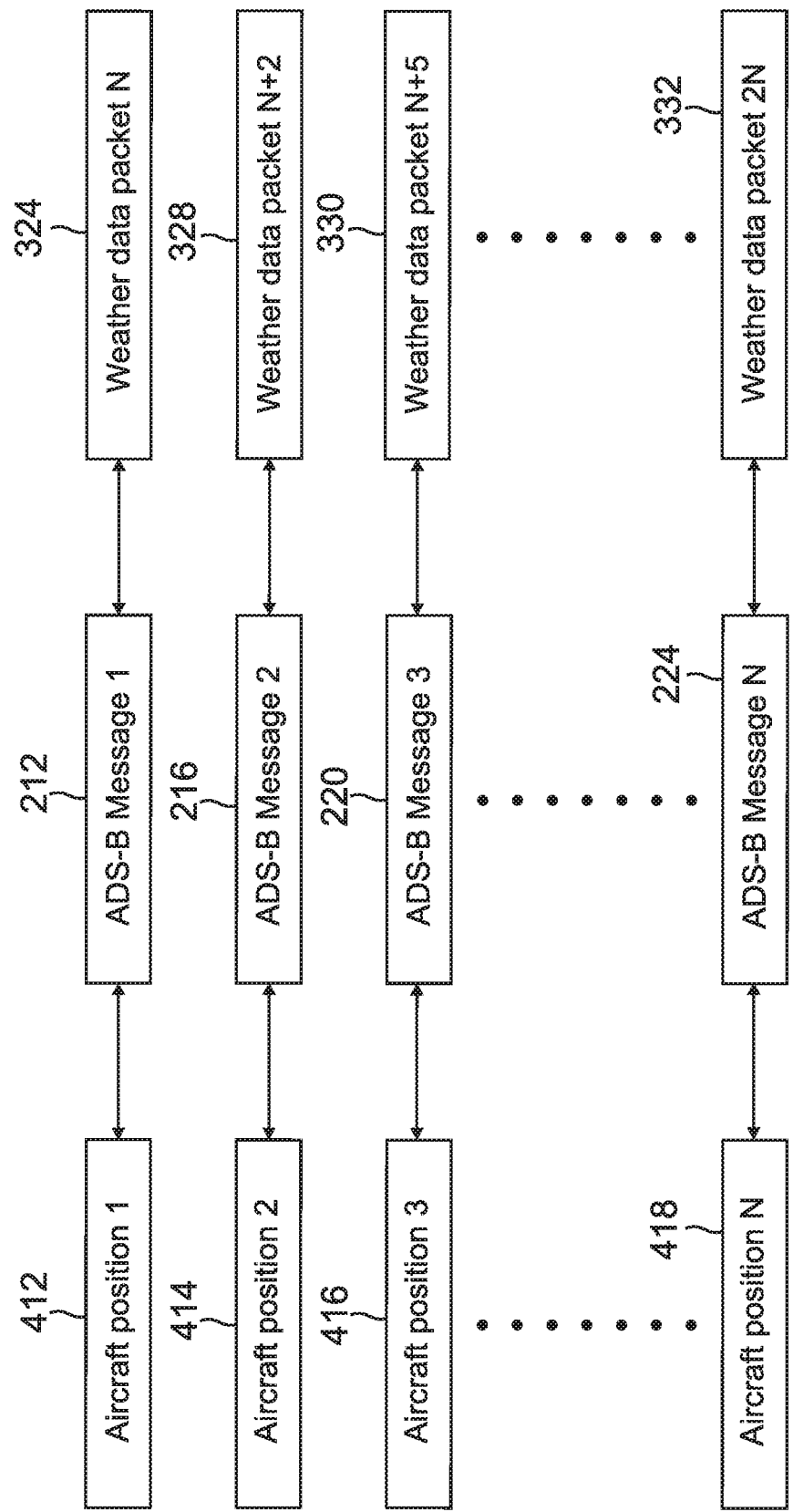
FIG. 4 is a schematic diagram illustrating derived relationships between aircraft position and data packets through the received ADS-B messages.

FIGS. 2-4 illustrate an exemplary implementation for downloading of aeronautical data using ADS-B.

FIG. 2 depicts the creation of a first data sequence structure 210 according to an exemplary embodiment, which includes receiving time information for each transmitted ADS-B message. For example, a first ADS-B message (block 212) received from an aircraft includes the aircraft position information and is stored along with the associated receiving time for the first ADS-B message (block 214) to form part of data sequence structure 210. Likewise, a second ADS-B message (block 216) received from the aircraft is stored along with the receiving time for the second ADS-B message (block 218) to form part of data sequence structure 210, and a third ADS-B message (block 220) received from the aircraft is stored along with the receiving time of the third ADS-B message (block 222) to form part of data sequence structure 210. One or more additional ADS-B messages N (block 224) received from the aircraft can also be stored along with the receiving time for the ADS-B messages N (block 226) to form part of data sequence structure 210.

FIG. 3 illustrates the creation of a second data sequence structure 310 according to an exemplary embodiment, which includes packet time information for each of one or more received aeronautical data packets in the form of weather data packets. Each weather data packet is transmitted from an aircraft weather radar. The aircraft position information is not included in each weather data packet, but the packet time, such as Coordinated Universal Time (UTC) information, still exists in each weather data packet. The UTC information includes the time at which the weather data packet was created.

For example, a first weather data packet (block 312) transmitted from the aircraft includes first UTC information (block 314), a second weather data packet (block 316) transmitted from the aircraft includes second UTC information (block 318), and a third weather data packet (block 320) transmitted from the aircraft includes third UTC information (block 322). One or more additional weather data packets N (block 324) transmitted from the aircraft includes corresponding UTC information N (block 326).

FIG. 4 shows the derived relationship between the aircraft position and the weather data packets through the ADS-B messages. The timing information from both the ADS-B messages and the weather data packets is compared to create a mapping correlation between the respective weather data packets and the ADS-B messages. This allows the aircraft position to be obtained for the weather data packets based on the position information in respective ADS-B messages.

For example, as illustrated in FIG. 4, weather data packet N (block 324) may be mapped to the first ADS-B message (block 212), and then correspondingly a first aircraft position (block 412) can be derived. Likewise, a second weather data packet N+2 (block 328) may be mapped to the second ADS-B message (block 216), and then correspondingly a second aircraft position (block 414) can be derived. A third weather data packet N+5 (block 330) may also be mapped to the third ADS-B message (block 220), and then correspondingly a third aircraft position (block 416) can be derived. One or more additional weather data packets 2N (block 332) may be mapped to a corresponding ADS-B message N (block 224), with the corresponding aircraft position N (block 418) being derived for each case.

Figure 5:
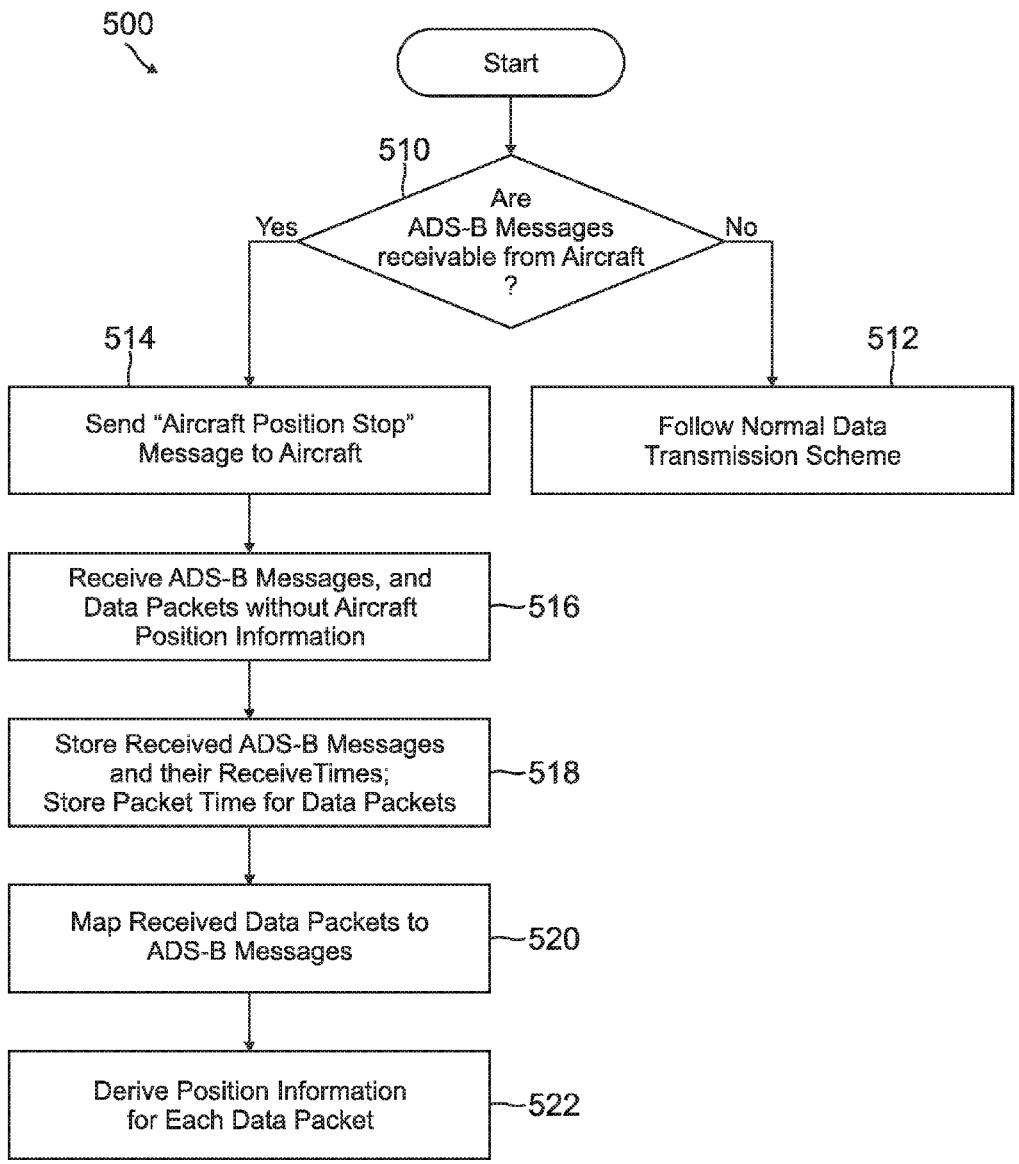
FIG. 5 is a flow diagram of an exemplary method for the implementation of enabling and disabling aircraft position information in downloading aeronautical data from an aircraft.

FIG. 5 is a flow diagram of a method 500 for the implementation of enabling and disabling of aircraft position information in downloading aeronautical data from an aircraft. At the start of method 500, a determination is made by a ground station whether ADS-B messages are receivable from an aircraft of concern (block 510). The ground station determination can be based on aircraft ADS-B capability or the ADS-B coverage. For example, the determination can be based on whether the ground station can hear the ADS-B message in a specific time window.

If ADS-B messages are not receivable from the aircraft, then a normal aeronautical data transmission scheme is followed, where for example, each weather data packet is associated with an aircraft position (block 512).

If the determination is made that ADS-B messages can be received from the aircraft, the ground station sends an "aircraft position stop" message to the aircraft to stop the aircraft position information from being transmitted with the data packets (block 514). The ground station then receives the ADS-B messages having the aircraft position information, and the data packets without aircraft position information (block 516). The received ADS-B messages and their respective receive times are stored in a data sequence structure, and the packet time for each received data packet is stored in another data sequence structure (block 518). The received data packets are then respectively mapped to the ADS-B messages (block 520). The aircraft position information can then be derived for each of the received data packets (block 522).

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, DVDs, Blu-ray discs, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a method for downloading aeronautical data using an automatic dependent surveillance-broadcast (ADS-B), the method comprising: creating a first data sequence structure that includes a receive time for each of one or more received ADS-B messages; creating a second data sequence structure that includes a packet time for each of one or more received aeronautical data packets that are without position information; mapping the one or more received aeronautical data packets respectively to the one or more ADS-B messages by comparing the receive time for each of one or more received ADS-B messages with the packet time for each of one or more received aeronautical data packets to produce a correlation between the one or more ADS-B messages and the one or more aeronautical data packets; and deriving position information for each of the one or more received aeronautical data packets from each correlation between an ADS-B message and an aeronautical data packet.

Example 2 includes the method of Example 1, wherein the first data sequence structure comprises one to N received ADS-B messages that each include aircraft position information and the receive time for each ADS-B message.

Example 3 includes the method of any of Examples 1-2, wherein the second data sequence structure comprises one to N received aeronautical data packets without aircraft position information that include the packet time for each aeronautical data packet.

Example 4 includes the method of any of Examples 1-3, wherein the one or more received aeronautical data packets comprise one or more weather data packets sent from an aircraft weather radar.

Example 5 includes the method of any of Examples 1-4, wherein the packet time for each of the one or more received aeronautical data packets comprises coordinated universal time (UTC) information.

Example 6 includes a computer program product comprising a non-transitory computer readable medium having processor executable instructions stored thereon to perform a method for downloading aeronautical data using ADS-B according to any of Examples 1-5.

Example 7 includes a computer system comprising at least one processor, and a non-transitory computer readable medium having instructions stored thereon executable by the processor to perform a method for downloading aeronautical data using ADS-B, the method comprising: creating a first data sequence structure that includes a receive time for each of one or more ADS-B messages received from an aircraft; creating a second data sequence structure that includes a packet time for each of one or more weather data packets received from the aircraft and that are without aircraft position information; mapping the one or more weather data packets respectively to the one or more ADS-B messages by comparing the receive time for each of one or more ADS-B messages with the packet time for each of one or more weather data packets to produce a correlation between the one or more ADS-B messages and the one or more weather data packets; and deriving aircraft position information for each of the one or more weather data packets from each correlation between an ADS-B message and a weather data packet.

Example 8 includes the computer system of Example 7, wherein the first data sequence structure comprises one to N received ADS-B messages that each include aircraft position information and the receive time for each ADS-B message.

Example 9 includes the computer system of any of Examples 7-8, wherein the second data sequence structure comprises one to N received weather data packets without aircraft position information that include the packet time for each weather data packet.

Example 10 includes the computer system of any of Examples 7-9, wherein the one or more weather data packets are from a weather radar on the aircraft.

Example 11 includes a method for downloading aeronautical data from an aircraft, the method comprising: determining whether ADS-B messages are receivable from an aircraft; wherein when ADS-B messages are receivable from the aircraft, the method comprises: sending a message to the aircraft to stop transmission of aircraft position information with one or more aeronautical data packets; receiving one or more ADS-B messages, and one or more aeronautical data packets without aircraft position information and each with a packet time; storing a receive time for the one or more ADS-B messages, and the packet time for each of the one or more aeronautical data packets; and mapping the one or more aeronautical data packets respectively to the one or more ADS-B messages.

Example 12 includes the method of Example 11, wherein a ground station determines whether ADS-B messages are receivable from the aircraft.

Example 13 includes the method of Example 12, wherein the ground station determination is based on aircraft ADS-B capability or ADS-B coverage.

Example 14 includes the method of any of Examples 12-13, wherein the ground station determination is based on whether the ground station can hear ADS-B messages in a specified time window.

Example 15 includes the method of any of Examples 11-14, wherein the one or more aeronautical data packets comprises one or more weather data packets sent from a weather radar on the aircraft.

Example 16 includes the method of any of Examples 11-15, wherein the packet time for each of the one or more aeronautical data packets comprises UTC information.

Example 17 includes the method of any of Examples 11-16, wherein the receive time for each of the one or more ADS-B messages is stored in a first data sequence structure; and the packet time for each of the one or more aeronautical data packets is stored in a second data sequence structure.

Example 18 includes the method of any of Examples 11-17, further comprising deriving an associated aircraft position for each of the one or more aeronautical data packets mapped respectively to the one or more ADS-B messages.

Example 19 includes the method of Example 18, wherein the associated aircraft position is derived by comparing the packet time for each of the one or more received aeronautical data packets and the receive time for each of the one or more ADS-B messages to produce a correlation between the one or more ADS-B messages and the one or more aeronautical data packets.

Example 20 includes the method of Example 11, wherein when ADS-B messages are not receivable from the aircraft, the method comprises receiving one or more aeronautical data packets each with aircraft position information.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for downloading aeronautical data using an automatic dependent surveillance-broadcast (ADS-B), the method comprising:
   creating a first data sequence structure that includes a receive time for each of one or more received ADS-B messages;
   creating a second data sequence structure that includes a packet time for each of one or more received aeronautical data packets that are without position information;
   mapping the one or more received aeronautical data packets respectively to the one or more ADS-B messages by comparing the receive time for each of one or more received ADS-B messages with the packet time for each of one or more received aeronautical data packets to produce a correlation between the one or more ADS-B messages and the one or more aeronautical data packets; and
   deriving position information for each of the one or more received aeronautical data packets from each correlation between an ADS-B message and an aeronautical data packet.

2. The method of claim 1, wherein the first data sequence structure comprises one to N received ADS-B messages that each include aircraft position information and the receive time for each ADS-B message.

3. The method of claim 2, wherein the second data sequence structure comprises one to N received aeronautical data packets without aircraft position information that include the packet time for each aeronautical data packet.

4. The method of claim 1, wherein the one or more received aeronautical data packets comprise one or more weather data packets sent from an aircraft weather radar.

5. The method of claim 1, wherein the packet time for each of the one or more received aeronautical data packets comprises coordinated universal time (UTC) information.

6. A computer program product, comprising:
   a non-transitory computer readable medium having processor executable instructions stored thereon to perform a method for downloading aeronautical data using ADS-B according to claim 1.

7. A computer system, comprising:
   at least one processor; and
   a non-transitory computer readable medium having instructions stored thereon executable by the processor to perform a method for downloading aeronautical data using an automatic dependent surveillance-broadcast (ADS-B), the method comprising:
      creating a first data sequence structure that includes a receive time for each of one or more ADS-B messages received from an aircraft;
      creating a second data sequence structure that includes a packet time for each of one or more weather data packets received from the aircraft and that are without aircraft position information;
      mapping the one or more weather data packets respectively to the one or more ADS-B messages by comparing the receive time for each of one or more ADS-B messages with the packet time for each of one or more weather data packets to produce a correlation between the one or more ADS-B messages and the one or more weather data packets; and
      deriving aircraft position information for each of the one or more weather data packets from each correlation between an ADS-B message and a weather data packet.

8. The computer system of claim 7, wherein the first data sequence structure comprises one to N received ADS-B messages that each include aircraft position information and the receive time for each ADS-B message.

9. The computer system of claim 8, wherein the second data sequence structure comprises one to N received weather data packets without aircraft position information that include the packet time for each weather data packet.

10. The computer system of claim 7, wherein the one or more weather data packets are from a weather radar on the aircraft.

11. A method for downloading aeronautical data from an aircraft, the method comprising:
    determining whether automatic dependent surveillance-broadcast (ADS-B) messages are receivable from an aircraft;
    wherein when ADS-B messages are receivable from the aircraft, the method comprises:
       sending a message to the aircraft to stop transmission of aircraft position information with one or more aeronautical data packets;
       receiving one or more ADS-B messages, and one or more aeronautical data packets without aircraft position information and each with a packet time;
       storing a receive time for the one or more ADS-B messages, and the packet time for each of the one or more aeronautical data packets; and
       mapping the one or more aeronautical data packets respectively to the one or more ADS-B messages.

12. The method of claim 11, wherein a ground station determines whether ADS-B messages are receivable from the aircraft.

13. The method of claim 12, wherein the ground station determination is based on aircraft ADS-B capability or ADS-B coverage.

14. The method of claim 12, wherein the ground station determination is based on whether the ground station can hear ADS-B messages in a specified time window.

15. The method of claim 11, wherein the one or more aeronautical data packets comprises one or more weather data packets sent from a weather radar on the aircraft.

16. The method of claim 11, wherein the packet time for each of the one or more aeronautical data packets comprises coordinated universal time (UTC) information.

17. The method of claim 11, wherein:
    the receive time for each of the one or more ADS-B messages is stored in a first data sequence structure; and
    the packet time for each of the one or more aeronautical data packets is stored in a second data sequence structure.

18. The method of claim 11, further comprising deriving an associated aircraft position for each of the one or more aeronautical data packets mapped respectively to the one or more ADS-B messages.

19. The method of claim 18, wherein the associated aircraft position is derived by comparing the packet time for each of the one or more received aeronautical data packets and the receive time for each of the one or more ADS-B messages to produce a correlation between the one or more ADS-B messages and the one or more aeronautical data packets.

20. The method of claim 11, wherein when ADS-B messages are not receivable from the aircraft, the method comprises:

receiving one or more aeronautical data packets each with aircraft position information.

\* \* \* \* \*